US009933274B2

(12) United States Patent
Holden et al.

(10) Patent No.: US 9,933,274 B2
(45) Date of Patent: Apr. 3, 2018

(54) DETERMINING LOCATION INFORMATION USING A LOCATION DATA POINT PROVIDED BY A COMPUTING DEVICE

(71) Applicant: Uber Technologies, Inc., San Francisco, CA (US)

(72) Inventors: Paul-Phillip Holden, San Francisco, CA (US); Matthew Sweeney, San Francisco, CA (US); Jeremy Grosser, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 15/682,281

(22) Filed: Aug. 21, 2017

(65) Prior Publication Data
US 2017/0343377 A1    Nov. 30, 2017

Related U.S. Application Data (63) Continuation of application No. 15/295,719, filed on Oct. 17, 2016, now Pat. No. 9,778,063, which is a
(Continued)

(51) Int. Cl.
*H04W 24/00* (2009.01)
*G01C 21/36* (2006.01)
*H04W 4/02* (2018.01)

(52) U.S. Cl.
CPC ....... *G01C 21/3682* (2013.01); *G01C 21/367* (2013.01); *H04W 4/021* (2013.01)

(58) Field of Classification Search
None
See application file for complete search history.

(56) References Cited

U.S. PATENT DOCUMENTS 7,606,663 B2 * 10/2009 Neef .................... G01C 21/362
                                                                    455/456.1
8,090,389 B2 *  1/2012 Tysowski ................ H04M 1/56
                                                                    455/456.2
(Continued)

FOREIGN PATENT DOCUMENTS

CN          101584186 A     11/2009
WO     WO 2009/029910 A2     3/2009
(Continued)

OTHER PUBLICATIONS

Australian First Examination Report, Australian Patent Application No. 2014331620, dated Apr. 12, 2016, 2 pages.
(Continued)

*Primary Examiner* — Tuan A Tran
(74) *Attorney, Agent, or Firm* — Fenwick & West LLP (57) ABSTRACT

A system and method for determining location information using a location data point provided by a computing device is described. A location data point is received by a system from a client computing device. The system determines whether the location data point is within a predefined region from a plurality of predefined regions configured by a user of the system. If the location data point is within a predefined region, location information corresponding to the predefined region is transmitted to the client device. If the location data point is not within a predefined region, one or more third-party reverse geocoding services can be used that translates the location data point to a street address.

20 Claims, 6 Drawing Sheets

Related U.S. Application Data continuation of application No. 14/656,448, filed on Mar. 12, 2015, now Pat. No. 9,482,549, which is a continuation of application No. 14/506,473, filed on Oct. 3, 2014, now Pat. No. 9,389,096.

(60) Provisional application No. 61/887,239, filed on Oct. 4, 2013.

(56) References Cited

U.S. PATENT DOCUMENTS

| | | | | |
|---|---|---|---|---|
| 8,437,777 | B2 * | 5/2013 | Wang | G06F 17/30265 455/456.1 |
| 8,447,325 | B2 * | 5/2013 | Anakata | H04W 4/02 455/456.1 |
| 8,489,127 | B2 | 7/2013 | Huang et al. | |
| 8,538,679 | B1 * | 9/2013 | Takyar | G06Q 10/047 455/456.1 |
| 8,538,956 | B1 * | 9/2013 | Szabadka | G06F 17/30241 707/706 |
| 8,611,326 | B2 * | 12/2013 | Huang | G01S 5/0027 370/328 |
| 8,787,934 | B2 * | 7/2014 | Wang | G06F 17/30265 455/456.1 |
| 8,792,917 | B2 * | 7/2014 | Huang | G01S 5/0257 455/456.1 |
| 8,902,260 | B2 * | 12/2014 | Kuhne | G09B 29/006 345/661 |
| 2002/0054082 | A1 * | 5/2002 | Karpf | G06F 3/0481 715/738 |
| 2009/0156241 | A1 | 6/2009 | Staffaroni et al. | |
| 2009/0171939 | A1 | 7/2009 | Athsani et al. | |
| 2009/0222482 | A1 | 9/2009 | Klassen et al. | |
| 2010/0253542 | A1 | 10/2010 | Seder et al. | |
| 2010/0317368 | A1 | 12/2010 | Augst et al. | |
| 2011/0052042 | A1 | 3/2011 | Ben Tzvi | |
| 2012/0041675 | A1 * | 2/2012 | Juliver | G06Q 10/08 701/465 |
| 2012/0158445 | A1 * | 6/2012 | Dufford | G06Q 10/063 705/7.11 |
| 2013/0072226 | A1 | 3/2013 | Thramann | |
| 2013/0096813 | A1 | 4/2013 | Geffner et al. | |
| 2013/0132140 | A1 | 5/2013 | Amin et al. | |
| 2013/0139044 | A1 | 5/2013 | Iversen | |
| 2013/0196692 | A1 | 8/2013 | Huang et al. | |
| 2013/0317368 | A1 | 11/2013 | Warren et al. | |
| 2014/0012909 | A1 | 1/2014 | Sankar et al. | |
| 2014/0067901 | A1 | 3/2014 | Shaw et al. | |

FOREIGN PATENT DOCUMENTS

| | | |
|---|---|---|
| WO | WO 2011/067741 A1 | 6/2011 |
| WO | WO 2012/072862 A1 | 6/2012 |

OTHER PUBLICATIONS

Australian First Examination Report, Australian Patent Application No. 2017203814, dated Jun. 8, 2017, 2 pages.
Chinese Second Office Action, Chinese Patent Application No. 201480066147.9, dated Jul. 18, 2017, 13 pages.
Chinese First Office Action, Chinese Patent Application No. 201480066147.9, dated Dec. 29, 2016, 12 pages.
European Extended Search Report, European Patent Application No. 14851061.3, dated May 10, 2017, 11 pages.
International Search Report dated Jan. 7, 2015, PCT/US14/59183.
Japanese Office Action, Japanese Patent Application No. 2016-519755, dated Nov. 1, 2016. 13 pages.
Korean Office Action, Korean Application No. 10-2016-7011765, dated Feb. 7, 2017, 5 pages.
United States Office Action, U.S. Appl. No. 14/656,448, dated Feb. 25, 2016, 9 pages.
European Examination Report, European Application No. 14851061.3, dated Jan. 16, 2018, 13 pages.

\* cited by examiner

DETERMINING LOCATION INFORMATION USING A LOCATION DATA POINT PROVIDED BY A COMPUTING DEVICE

CROSS-REFERENCE TO RELATED APPLICATIONS

This application is a continuation of U.S. patent application Ser. No. 15/295,719, filed Oct. 17, 2016 which is a continuation of U.S. patent application Ser. No. 14/656,448, filed Mar. 12, 2015, which is a continuation of U.S. patent application Ser. No. 14/506,473, filed Oct. 3, 2014, which claims the benefit to U.S. Provisional Patent Application No. 61/887,239, filed Oct. 4, 2013, each of which are incorporated by reference in their entirety.

BACKGROUND

Some on-demand services may arrange for transport to be provided for a user by a driver of a vehicle. In some cases, the user and the driver can each operate a computing device to communicate with a system that arranges the transport. To facilitate the transport, the system can provide location information for the transport to the computing devices of the user and the driver.

DETAILED DESCRIPTION

Examples described herein provide for a system that receives a location data point from a computing device and determines location information corresponding to that location data point for purposes of providing location-based services. In one example, the system can determine which resource to use to determine the location information, based on which resources are available or accessible by the system.

According to an example, the system can receive a location data point, such as a global positioning system (GPS) data point, from a client computing device. The location data point can comprise a latitude, a longitude, and an error value. The system can perform a reverse geocoding process for the location data point to determine the corresponding location information or address. In one example, the system can first determine whether the location data point is within a predefined region of a plurality of predefined regions that have been configured by a user (e.g., an administrator) of the system. The plurality of predefined regions can be stored, for example, in a database accessible by the system. If the location data point is within a predefined region, the location information corresponding to the predefined region can be identified and transmitted to the client device.

If the location data point is not within a predefined region, the system can determine whether a third-party reverse geocoding service is available or accessible for translating or converting the location data point to an address, such as a street address. In some examples, the system can communicate with a plurality of third-party reverse geocoding services. If a third-party reverse geocoding service is accessible for translating the location data point to an address, the system can transmit a request to the third-party reverse geocoding service, which includes the location data point, and can receive the corresponding address. The address can then be transmitted to the client device.

In some cases, the third-party reverse geocoding service (s) may not be available for or accessible by the system. In such situations, the system can determine whether a map database of the system (e.g., an internal database maintained by the system) is available for translating the location data point to the address. If the map database is available, the system can retrieve a stored address from the map database using the location data point and transmit the retrieved address to the client device. If the map database is unavailable (or if no address is found that corresponds to the location data point), the system can identify a specified text string to be transmitted to the client device. In this manner, the system 100 can perform a reverse geocoding process based on a predetermined hierarchy or order.

Still further, the system can also receive a request for a transport service from the client device. The request for transport can include a location data point specified/selected by the user of the client device (e.g., either the previously transmitted location data point or a new location data point). The system can select a driver capable of providing the transport service based on the location data point of the request for transport. According to some examples, the system can determine whether the preferred language of the user of the client device matches the preferred language of the selected driver. If the preferred languages match, the system can transmit the determined location information/ address to the device of the driver. On the other hand, if the preferred languages do not match, the system can perform the reverse geocoding process, e.g., on behalf of the driver, to determine the location information or address in the preferred language of the driver.

As used herein, a client device, a driver device, and/or a computing device refer to devices corresponding to desktop computers, cellular devices or smartphones, personal digital assistants (PDAs), laptop computers, tablet devices, television (IP Television), etc., that can provide network connectivity and processing resources for communicating with the system over a network. A driver device can also correspond to other devices of a transit object, or custom hardware, etc. The client device and/or the driver device can also operate an application configured to communicate with the system.

Still further, the system, for example, can enable location-based services (such as a transportation service, a delivery service, an entertainment service) to be arranged between individuals using the computing devices described. As an example, a user can request an on-demand service, such as a transportation or delivery service (e.g., food delivery, messenger service, food truck service, or product shipping) or an entertainment service (e.g., mariachi band, string quartet), and the system can select a service provider, such as a driver, food provider, band, etc., that uses devices that communicate with the system.

In still another example, multiple location data points are received over one or more networks, wherein the multiple location points are communicated from one or more client devices over a duration of time. In response to receiving each of the multiple location data points, a data store is accessed that includes a plurality of predefined geofences, in order to determine whether that location data point is within a predefined region of any of the plurality of predefined geofences. At least one of the plurality of predefined geofences is configured by a user of the system. For at least one location data point that is not within a predefined region, (i) a determination is made as to another resource is to be used to provide location information to the client device. One or more third-party reverse geocoding services are also determined to translate the location data point. A request is transmitted to a third-party reverse geocoding service to translate each of the multiple location data points to a street address, where the request including the location data point. A corresponding street address is received for each of the multiple location data points. For each of the multiple location data points, the corresponding street address is transmitted to a client device that communicated the location data point.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

Figure 1:
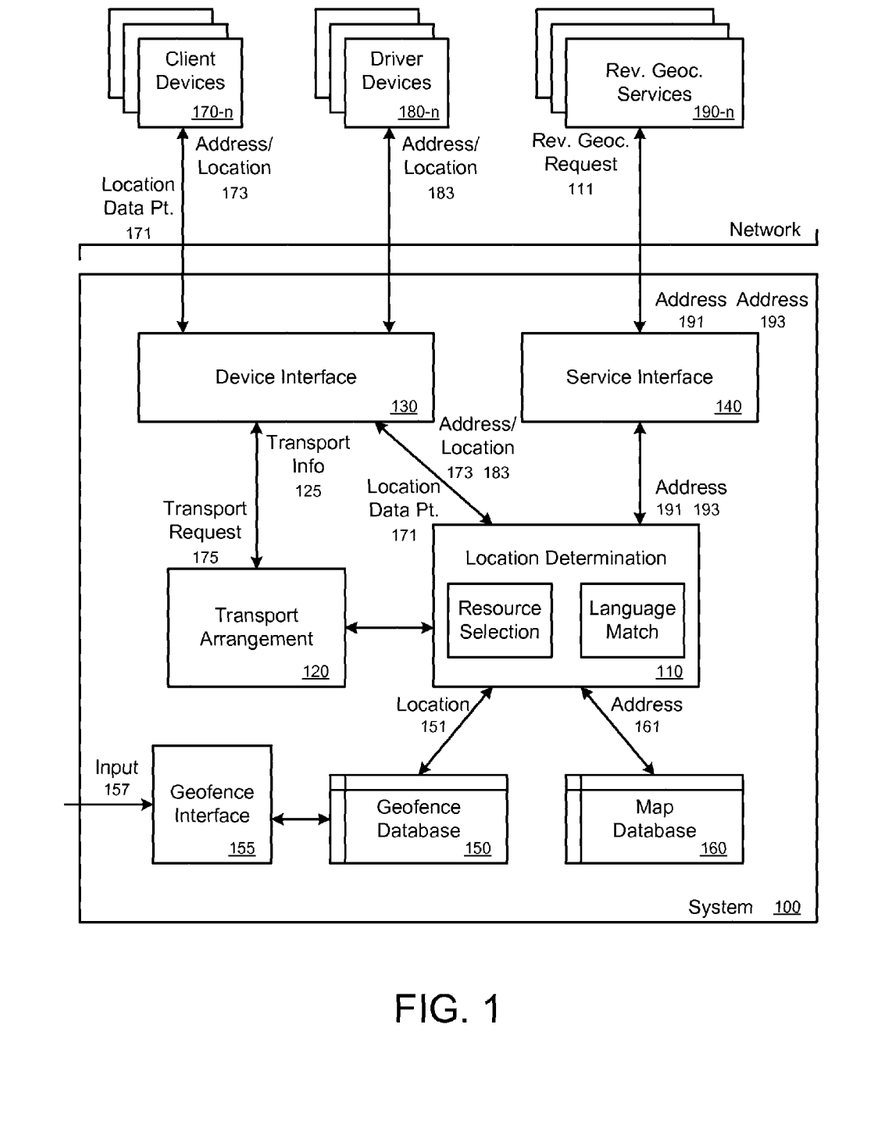
FIG. 1 illustrates an example system to determine location information using a location data point, under an embodiment.

FIG. 1 illustrates an example system to determine location information using a location data point, under an embodiment. In one example, the system can operate with or as part of another system that enables services to be arranged between parties (e.g., arrange a transport service or a delivery service between a user and a service provider). For example, the system of FIG. 1 can correspond to a dispatch system that selects a driver for purpose of arranging a transport service for a user. The system 100 can receive a location data point from a client device of the user and perform a reverse geocoding process to determine an address or other location information corresponding to the location data point.

Typically, a computing device can provide a location data point to a third-party reverse geocoding service and the third-party reverse geocoding service can perform a translation of the location data point to a street address. However, there may be disadvantages for solely using a third-party reverse geocoding service to determine location information. For example, third-party reverse geocoding service(s) can have rate limits, such as a limited number of queries per second (QPS) allowed for a particular device, and/or can be costly. In situations where multiple client devices operate on the same network, such as on a wireless local area network (WLAN), the third-party reverse geocoding service can view the multiple devices querying the third-party reverse geocoding service as being the same device and lock out the devices (e.g., prevent the devices from making calls to the third-party reverse geocoding service). In addition, reliance on a particular third-party reverse geocoding service may be problematic in some situations, such as when address data is inaccurate or when computing resources of the third-party reverse geocoding service fail (e.g., server crash). Rather than enabling the client devices to directly transmit the location data point(s) to the third-party reverse geocoding services, the system 100 of FIG. 1 can receive the location data point(s) from a client device and can perform a reverse geocoding process that may or may not utilize the third-party reverse geocoding service(s).

According to an example, the system 100 includes a location determination 110, a transport arrangement 120, a device interface 130, a service interface 140, a geofence database 150, a geofence interface 155, and a map database 160. A plurality of client devices 170 and a plurality of driver devices 180 can communicate with the system 100 over one or more networks via the device interface 130. In some examples, the system 100 can also communicate with one or more third-party reverse geocoding services 190. The components of the system 100 can combine to receive a location data point(s) from a client device 170 and perform a reverse geocoding process to determine an address or location information corresponding to the location data point(s). Logic can be implemented with various applications (e.g., software) and/or with hardware of a computer system that implements the system 100.

Depending on implementation, one or more components of the system 100 can be implemented on network side resources, such as on one or more servers. The system 100 can also be implemented through other computer systems in alternative architectures (e.g., peer-to-peer networks, etc.).

As an addition or an alternative, some or all of the components of the system 100 can be implemented on client devices 170, such as through applications that operate on the client devices 170 and/or the driver devices 180. For example, a client application, such as a service application, can execute to perform one or more of the processes described by the various components of the system 100. The system 100 can communicate over a network, via a network interface (e.g., wirelessly or using a wireline), to communicate with the one or more client devices 170 and the one or more driver devices 180.

The system 100 can communicate, over one or more networks, with client devices 170 and driver devices 180 using the device interface 130. The device interface 130 can manage communications between the system 100 and remote computing devices. In some examples, the client devices 170 (and driver devices 180) can individually operate a service application that can interface with the device interface 130 to communicate with the system 100. According to some examples, the applications can include or use an application programming interface (API), such as an externally facing API, to communicate data with the device interface 130. The externally facing API can provide access to the system 100 via secure access channels over the network through any number of methods, such as web-based forms, programmatic access via restful APIs, Simple Object Access Protocol (SOAP), remote procedure call (RPC), scripting access, etc.

According to some examples, the location determination 110 can receive a location data point 171 from a client device 170 via the device interface 130. For example, when a user of a client device 170 operates a service application, the user can interact with the user interface of the service application to select or specify a particular location pertaining to the on-demand and/or location-based service. The user can interact with a map interface, for example, which shows the user's current location (e.g., the current location of the client device 170) as well as one or more graphic features (e.g., a pin) that can be moved on the map by the user to indicate a location for use with requesting a location-based service. In one example, the location specified by the pin on the map can be a pick-up location and/or a destination location for a transport service, or a drop-off location for a delivery service.

When the user selects a location, e.g., by moving the pin on the map interface to a particular location, the client device 170 determines and transmits a location data point 171 (corresponding to the particular location) to the system 100 via the device interface 130. According to examples, the location data point 171 corresponding to the selected location includes a latitude, a longitude, and an error value. For example, the client device 170 can include a global positioning system (GPS) component and/or other components that can determine the GPS coordinates for the current location of the client device 170 or the selected location on the map interface. The GPS component can also include an error value for the location data point 171 to indicate the accuracy of the latitude and the longitude. For example, a location data point 171 with a high error value is deemed to be not as accurate as a location data point 171 with a lower error value (e.g., the GPS component can have a high error for a location data point when, at the time the GPS coordinates are determined, there is signal interference, hardware glitches, etc.).

According to one example, each time the user of the client device 170 specifies a location on the map interface of the service application, such as a pick-up location for a transport service, the client device 170 can provide the corresponding location data point 171 to the system 100. For example, the user can select a first location on the map interface (e.g., move the pin via a finger touch on the touch-sensitive display of the client device 170 and then remove the finger once the desired location has been specified), and the client device 170 can determine that the user has selected a location in response to the user removing the finger from the touch-sensitive display and transmit a corresponding location data point 171 to the system 100. Immediately thereafter (e.g., one second later), the user can select a different second location on the map interface (e.g., the user decides that a second location is better for transport service). Similarly, the client device 170 can then transmit a location data point 171 corresponding to the second location.

In some example, the user can continue to change the specified location (and cause the client device 170 to continue transmitting corresponding location data points 171) until (i) the user makes a transport request 175 to the system 100, (ii) a predetermined time after the user made the transport request 175, and/or (iii) the user is picked up by a driver providing the transport service. Each time the user specifies a location, the service application running on the user's client device 170 provides the corresponding location data point 171 to the system 100 so that a corresponding address or location information can be determined by the system 100 and provided to the service application. According to one example, the location data point 171 can be provided, by the service application to the system 100, as part of a request for a corresponding address. In this manner, the user can view and verify that the particular address is the address in which the user wants to be picked up at for transport service (or dropped off at, in another example).

The location determination 110 receives the location data point 171 from the client device 170 and in response, can perform a reverse geocoding process for that location data point 171. In one example, the location determination 110 can perform the reverse geocoding process by determining, based on one or more conditions, which resource (e.g., which particular database, which third party reverse geocoding service, etc.) to use to translate the location data point 171 to a corresponding address (e.g., a street address) or to a corresponding location name, information, or identifier. In some examples, the location determination 110 includes a resource selection and a language match.

The location determination 110 can access or communicate with a plurality of resources to determine location information or an address for a received location data point 171. The plurality of resources can include the geofence database 150, the map database 160, a plurality of third-party reverse geocoding services 190, and/or other databases, such as a database for storing text strings, not illustrated in FIG. 1. Depending on implementation, the geofence database 150 and/or the map database 160 can be included with the system 100 and/or maintained by administrator user(s) of the system 100.

According to an example, the geofence database 150 is a database that stores a plurality of user-created or user-configured geofences (e.g., a predefined region defined by three or more location data points) each corresponding to a descriptive text string. Each entry in the geofence database 150 can include (i) a plurality of location points that define the boundary of the geofence and (ii) location information (e.g., as a specified text string) corresponding to the geofence. For example, a geofence can be created for a geographic region, such as an area near an exit or door (e.g., near the pick-up area) of Terminal 2 of San Francisco International Airport, and identified as "Terminal 2, SFO." In some examples, a geofence entry can also include a time period (e.g., a start date, a start time, an end date, an end time, etc.) for that geofence entry. An administrator can interact with a geofence interface 155 via one or more inputs 157 to create, edit, and/or delete geofences in the geofence database 150.

The map database 160 can correspond to mapping information stored with the system 100. For example, the mapping information can be provided by or retrieved from mapping sources, such as OpenStreetMap (OSM), an open source mapping database, or from other mapping sources. The map database 160 can be periodically updated using information from OSM and/or can be updated by an administrator of the system 100 (e.g., the system 100 stores and maintains the map database 160). The location determination 110 can access the geofence database 150 and/or the map database 160 to determine location information corresponding to the received location data point 171.

In addition, the system 100 can also access one or more third-party reverse geocoding services 190 over a network via one or more service interfaces 140. A third-party reverse geocoding service provides a translation of a location data point, such as a latitude and longitude, to a readable address or name. A plurality of different third-party reverse geocoding services 190 can exist and be available to the system 100 (e.g., via the service interface 140). For example, a third-party reverse geocoding service 190 can provide street addresses for location data points that are within a particular region, such as a large city or country (e.g., a third-party reverse geocoding service can specialize in translating location points in South Korea), while another third-party reverse geocoding service 190 can provide street addresses for location points that are within another region (e.g., France). In another example, a third-party reverse geocoding service 190 can be more encompassing than others (i.e., have a larger database of addresses that span a larger geographic region than others, such as Google Inc.'s reverse geocoding service).

Based on the received location data point 171 and one or more conditions of the system 100, the resource selection can determine which resource to use to determine the location information or address for the received location data point 171. For example, the resource selection can be configured, via one or more parameters inputted by the user of the system 100, to determine which resource to use first, then second if necessary, then third if necessary, and so forth, in order to determine the location information or address for the received location data point 171. In addition, in one example, the location determination 110 can first determine whether the error value received with the location data point 171 is equal to or greater than a threshold error value. An error value that is equal to greater than the threshold error value can indicate that the latitude and longitude determined by the GPS component of the client device 170, for example, has a high likelihood of being faulty or inaccurate.

If the location determination 110 determines that the error value is equal to or greater than a threshold error value, for example, the resource selection can select a text string database (not shown in FIG. 1) as the resource for the location determination 110 to access. The location determination 110 can retrieve from the text string database a default text string and provide the default text string to the client device 170 (that transmitted the location data point 171) indicating to the user that the location could not be determined or that the GPS component provided inaccurate location data. In other examples, the text string can also prompt the user to try again or select a new location. In such an example, because the error value is determined to be high, the location determination 110 can forego using a third-party reverse geocoding service 190, thereby reducing network bandwidth use and reducing the number of communications made to third-party reverse geocoding services 190, and in general, does not perform a reverse geocoding process to determine a corresponding address or location information for the received location data point 171.

As an addition or an alternative, in some examples, the resource selection can also store a ranking of the resources (relative to each other) to use to determine an address or location information for a corresponding received location data point 171. In one example, the resources can be previously categorized or ranked relative to each other by an administrator of the system 100. When the location determination 110 receives a location data point 171, the resource selection can select the highest ranked resource that is available or accessible to use to determine the corresponding address or location information. For example, the ranking of the resources to be used by the location determination 110 can be prioritized in this order: (1) the geofence database 150, (2) a location-specific third-party reverse geocoding service(s) 190, (3) a larger, more-generic third-party reverse geocoding service 190 (as compared to the location-specific third-party reverse geocoding service(s)), (4) the map database 160, and (5) text string database. The order of the resources can be different in other examples. In some examples, the administrator can adjust the rankings of the resources for the resource selection of the location determination 110.

When the location determination 110 receives the location data point 171, it can perform a reverse geocoding process to determine the corresponding address or location information. The reverse geocoding process includes determining which resource to use to determine the corresponding address or location information for the received location data point 171. In one example, the resource selection can determine that the geofence database 150 is to be used first (e.g., based on the above-mentioned ranking). The location determination 110 will access the geofence database 150 to determine whether the location data point 171 is located within a predefined region of a geofence (e.g., within a boundary defined by three or more location points for the geofence). If the location data point 171 is within a predefined region of a geofence, the location determination 110 identifies the corresponding location information 151 or descriptive text string from the geofence database 150 and provides the location information 151 or descriptive text string as location information 173 to the client device 170 via the device interface 130.

As discussed, a geofence entry that is stored in the geofence database 150 can be a time-based geofence entry, in which one or more durations of time is associated with that geofence entry. A duration of time can indicate when the geofence is "active." For example, a geofence can specify a duration of time in which an event (e.g., a concert, a sporting event, a parade, etc.) may occur. Such a time-based geofence can indicate descriptive text string corresponding to such an event when the user requests a pickup location in the geofence region during that duration of time. If the location determination 110 receives a location data point 171 that is within the predefined region of a time-based geofence, but is received a particular instance in time that is not during the specified duration of time of that geofence, the location determination 110 can indicate that the location data point 171 does not match an existing geofence entry in the geofence database 150 (e.g., even though the location data point 171 is within a predefined region of a time-based geofence). The resource selection can determine that another resource is to be used for the reverse geocoding process based on the specified order or hierarchy.

If the location data point 171 is not within a predefined region of any of the geofences in the geofence database 150, the resource selection can determine if a location-specific third-party geocoding service 190 corresponding to the location data point 171 is accessible. In some cases, a third-party reverse geocoding service may be inaccessible as a result of access limits (e.g., only a certain number of reverse geocoding requests can be made per second, such as a queries per second (QPS) limit), bandwidth limits, hardware problems (e.g., the third-party reverse geocoding service server is down or has network problems), etc. In addition, the location data point 171 can be within an area where no location-specific third-party geocoding service 190 is available. If a location-specific third-party geocoding service 190 is accessible (e.g., such as a location-specific third-party geocoding service 190 that is specific to a city, region, state, or country, etc., that the location data point 171 is located in), the location determination 110 can send a reverse geocode request 111 (e.g., query the location-specific third-party geocoding service 190) using the location data point 171 to a location-specific third-party geocoding service 190 that can provide the translation from the location data point 171 to a corresponding address. Once the location determination 110 receives the corresponding address 191 from the third-party reverse geocoding service 190, the location determination 110 can provide the address 173 to the client device 170.

On the other hand, if no location-specific third-party geocoding service 190 is accessible, the resource selection can determine if a larger, more-generic third-party reverse geocoding service 190 (as compared to the location-specific third-party reverse geocoding service(s)) is accessible. In some examples, the larger, more-generic third-party reverse geocoding service 190 can encompass a larger geography of data points (e.g., such as the reverse geocoding service provided by Google Inc.). If the larger, more-generic third-party reverse geocoding service 190 is accessible, the location determination 110 can send a reverse geocode request 111 (e.g., query the larger, more-generic third-party geocoding service 190) using the location data point 171 to a larger, more-generic third-party geocoding service 190 that can provide the translation from the location data point 171 to a corresponding address. Once the location determination 110 receives the corresponding address 191 from the larger, more-generic third-party reverse geocoding service 190, the location determination 110 can provide the address 173 to the client device 170.

If no third-party geocoding service 190 is accessible, the resource selection can determine if an internal map database 160 of the system 100 is accessible. The map database 160 can correspond to mapping information provided by or retrieved from one or more mapping sources. If the map database 160 is accessible, the location determination 110 can perform a lookup of the location data point 171 in the map database 160. If the location data point 171 has a corresponding address or location information 161, the location determination 110 can provide the address or location information 161 as location information 173 to the client device 170 via the device interface 130.

If the map database 160 is inaccessible or unavailable or if no corresponding address or location information is found in the map database 160, the resource selection can determine that no resources are available or accessible and the location determination 110 can identify a custom text string that is stored in the text string database. The location determination 110 can cause the custom text string, such as "Address is unavailable," "Select another location," or "Input an address in the text field," to be transmitted to the client device 170 via the device interface 130. In this manner, the user can receive accurate information regarding an address or location for an on-demand location-based service before making a request for the service.

According to some examples, the location determination 110 can also determine the preferred language of the user operating the client device 170. For example, the system 100 can maintain a profile database of users and/or the users' respective client devices 170. The system 100 can also maintain a profile database of drivers. A profile of a user can include a user identifier (ID) (e.g., a user name, email address, etc.) and a preferred language (e.g., English, Korean, Arabic, French, Chinese, etc.) along with other user information. When a user operates the client device 170 and the client device 170 provides a location data point 171 to the location determination 110 (e.g., along with the user ID), the language match can identify the preferred language of that user by accessing the user's profile from the profile database of users. In this manner, when a corresponding address or location information 173 is to be provided to the client device 170 of the user for the location data point 171 selected by that user, the location determination 110 can transmit the address or location information 173 in the preferred language of that user.

According to variations, the location determination 110 (e.g., via the language match) can provide the address or location information 173 in a preferred language of a corresponding user and/or user's client device 170 by (i) performing a translation of an address or location information that is determined using the reverse geocoding process (e.g., determined using one of the plurality of resources), (ii) accessing a third-party translation service to perform the translation of the determined address or location information, and/or (iii) during the reverse geocoding process, cause the location determination 110 to make the reverse geocoding request 111 to a third-party reverse geocoding service for the address 191 in the specified preferred language. In some examples, the translation can be a translation from one language (e.g., English) to another language that is expressed phonetically (e.g., phonetically in Chinese).

The system 100 can also operate with or as part of another system that enables location-based services to be arranged between parties. For example, the system 100 can include a transport arrangement 120 that receives a transport request 175 from a client device 170. A user of the client device 170 can select a location, such as a location for pick-up, and receive an address or location information 173 from system 100. The user can then make a transport request 175 via the service application operating on the client device 170 to system 100 using the selected location (or select a different location). The transport request 175 can include the location data point 171 and the transport arrangement 120 can arrange for transport to be provided by a driver based on the location data point 171, which specifies the pickup location. For example, a plurality of drivers can operate a plurality of driver devices 180. The transport arrangement 120 can select a driver based on the transport request 175 (e.g., what type of vehicle is requested, what time, the user's ratings, the driver's ratings, etc.) and/or the location data point 171 (e.g., the transport arrangement 120 can select a driver that is nearby as compared to other drivers who are further away).

When the transport arrangement 120 selects a driver, information 125 about the transport service can be provided to the client device 170 and the driver device 180 of the selected driver (e.g., to the service applications operating on the respective devices). The driver is also notified of the pickup location selected by the customer. Instead of providing a location data point 171 selected by the user of the client device 170 to the driver device 180, however, in some examples, the location determination 110 can provide the corresponding street address or location information (previously determined for the user of the client device 170) to the driver device 180 as address or location information 183.

According to some examples, the location determination 110 can also determine the preferred language of the selected driver. When a driver is selected by the transport arrangement 120, the language match of the location determination 110 can identify the preferred language of the selected driver by accessing the driver profiles in the profile database of drivers (e.g., using a driver ID). The language match can compare the preferred language of the user and the preferred language of the selected driver to determine if they are the same. If the preferred languages match, the location determination 110 does not have to perform another translation step, but instead transmit the determined address or location information (that was previously transmitted to the user's client device 170) to the driver device 180. On the other hand, if the preferred languages do not match, the location determination 110 can perform the reverse geocoding process again (e.g., to receive an address 193 in the preferred language of the driver) and/or perform a translation of the determined address in the preferred language of the user to the preferred language of the driver.

In this manner, the system 100 provides many benefits in providing location information or street addresses using a predefined reverse geocoding process. For example, if a third-party reverse geocoding service is unavailable or inaccessible, the system 100 can still provide relevant location information to the user of the client device 170 using other resources. Administrators of the system 100 can continue to update internal databases, such as the geofence database 150, to provide more granular and time-based location information messages to users. Such granular and time-based information may be more useful to a user as well as a service provider then a typical street address when roads, street corners, regions, etc., are blocked or closed due to temporary events (e.g., marathons or city festivals). In addition, because the system 100 provides the determined address or location information to both the client device and the driver device for purposes of an on-demand service, the user and the selected driver can receive the same information without having two separate reverse geocoding requests be made to a third-party reverse geocoding service (i.e., individually made by the client device and the driver device).

Methodology

Figure 2A:
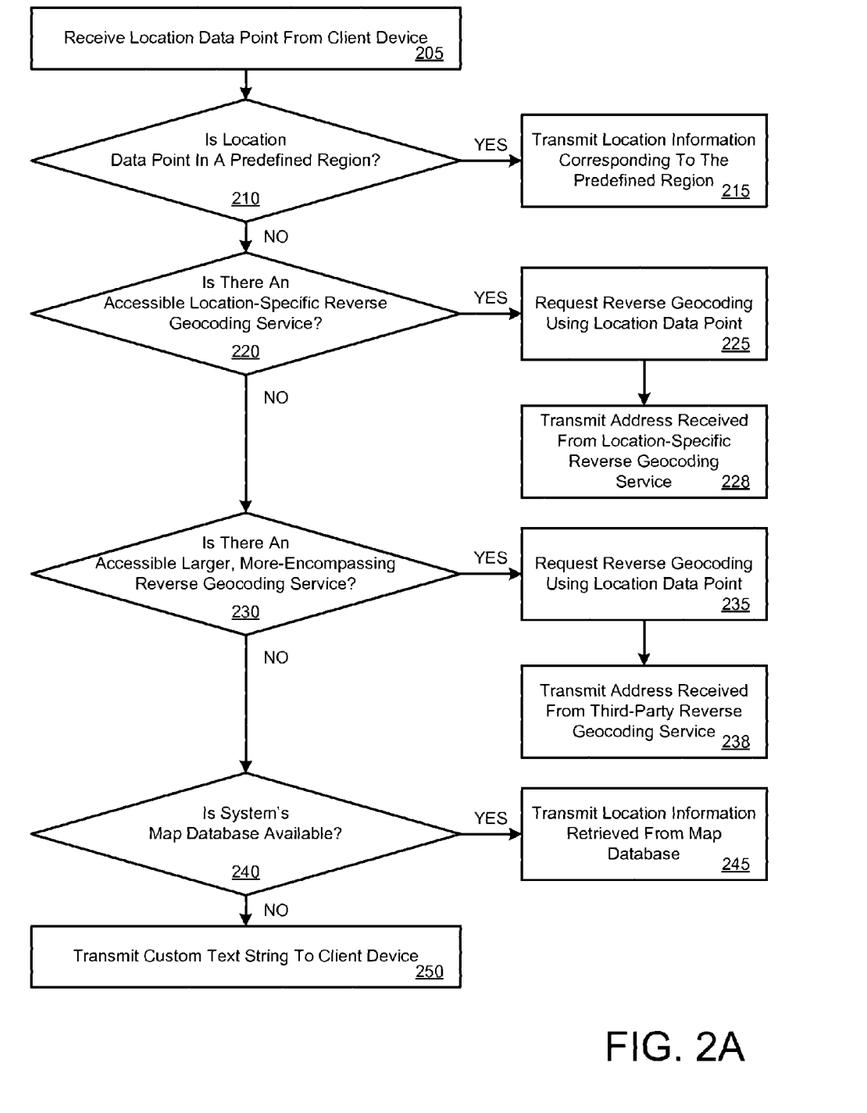
FIGS. 2A and 2B illustrate example methods for determining location information, according to an embodiment.
Figure 2B:
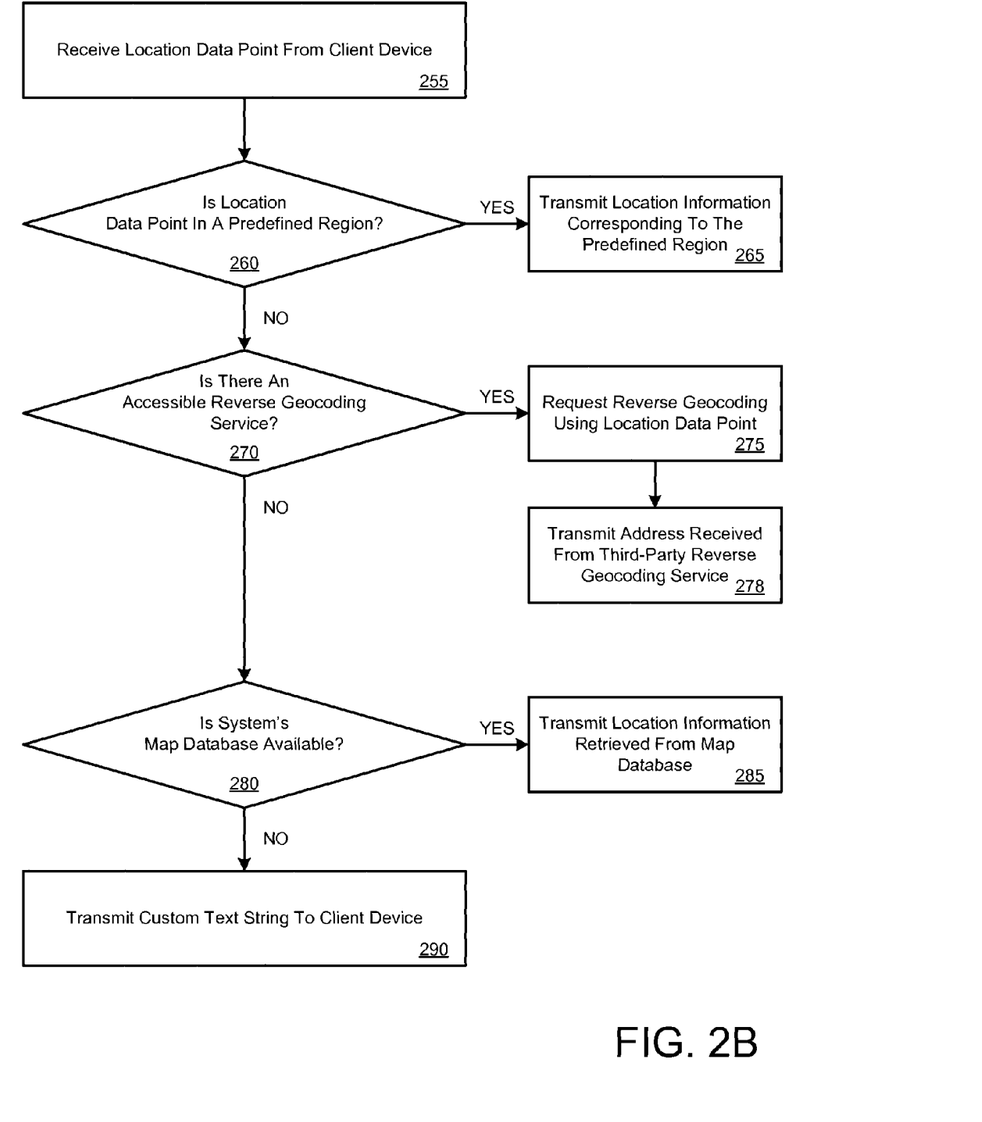

FIGS. 2A and 2B illustrate example methods for determining location information, according to an embodiment. Methods such as described by examples of FIGS. 2A and 2B can be implemented using, for example, components described with an embodiment of FIG. 1. Accordingly, references made to elements of FIG. 1 are for purposes of illustrating a suitable element or component for performing a step or sub-step being described.

Referring to FIG. 2A, the system 100 can receive a location data point, such as a GPS data point, from a client device over one or more networks (205). In some examples, the location data point can comprise a latitude, a longitude, and an error value. If the error value is less than a threshold error value, the system 100 can perform a reverse geocoding process (210-250) for the received location data point. An example of the reverse geocoding process, such as performed by the location determination 110 of FIG. 1, is described in detail.

The location determination 110 determines if the location data point is within a predefined region of a plurality of predefined regions that have been configured by an administrator of the system 100 (210). If the location data point is within a predefined region, the location determination 110 identifies location information corresponding to that predefined region, and transmits the location information to the client device (215). Information about the plurality of predefined regions can be stored in a geofence database as geofence entries. In some examples, a geofence entry can be timed-based, and include a time period (e.g., a start date, a start time, an end date, an end time, etc.) for that geofence entry. For example, a geofence entry can specify a region that surrounds and/or corresponds to AT&T Park, and have a time period related to the date and a duration of a baseball game played there (e.g., one hour prior to the game to one hour after the game). The corresponding location information text string for the predefined region of AT&T Park can recite, for example, "Giants game—walk to $3^{rd}$ St. and Brannan for pick-up." The location information can be informative to guide the user to move to another location for pickup (e.g., such as for a transport service) because the actual address/location might be congested with people and/or roads may be closed. In this manner, such a pre-configured location information provided to a user's client device can be more useful for the user for purposes of on-demand services.

If the location data point is not within a predefined region, the location determination 110 determines if there is an available or accessible location-specific reverse geocoding service (220). For example, a third-party reverse geocoding service may be unavailable if a rate limit, such as the number of queries per second (QPS) has been reached at the time the location data point is received from the client device. In another example, a third-party reverse geocoding service may be unavailable if a call is made to the third-party reverse geocoding service, and no address is received in response to the call (e.g., due to computing resources of the third-party reverse geocoding service having failed or crashed, or if network connectivity to the third-party reverse geocoding service has been lost).

If a location-specific third-party reverse geocoding service is accessible for translating the location data point to an address, the location determination 110 can transmit a request to the location-specific third-party reverse geocoding service (225). The request can include the location data point. In one embodiment, the request can also be made for a street address in a preferred language of the user. The location-specific third-party reverse geocoding service can translate the location data point to a street address and provide the address to the location determination 110. The location determination can transmit the address to the client device (228). In one variation, if the location-specific third-party reverse geocoding service is unable to provide an address for the location data point, the location determination 110 can determine if there are other third-party reverse geocoding services that are available or accessible for providing the translation. If no third-party reverse geocoding services are available or accessible, the location determination 110 can use other resources, such as the map database of the system 100 to determine location information or provide a custom text string to the client device.

Referring back to 220, if location-specific third-party reverse geocoding services are unavailable or inaccessible for translating the location data point to an address, the location determination 110 can determine if a larger, more-generic third-party reverse geocoding service (as compared to the location-specific third-party reverse geocoding service) is accessible (e.g., such as the reverse geocoding service provided by Google Inc.) (230). If a larger, more-generic third-party reverse geocoding service is accessible, the location determination 110 transmits a request to that location-specific third-party reverse geocoding service (235). The location determination 110 can receive the translated address and transmit the address to the client device (238).

In some cases, third-party reverse geocoding services may not be available for or accessible by the system 100. If no third-party reverse geocoding services are accessible or available, the location determination 110 can determine if a map database of the system 100 (e.g., an internal database maintained by the system 100) is available for translating the location data point to the address (240). If the map database is available, the location determination 110 can retrieve a stored address or location information from the map database using the location data point and transmit the retrieved address to the client device (245). If the map database is unavailable (or if no address is found that corresponds to the location data point), the system 100 can identify a specified text string to be transmitted to the client device (250) (e.g., "Address is unavailable," "Select another location," "Call your driver").

While FIG. 2A has been described in a specific order in which the location determination 110 accesses or attempts to access a plurality of resources, depending on variations, other orders or rankings of resources are possible. In other examples, the location determination 110 may not access or attempt to access certain resources. For example, when a total QPS limit has been reached for a third-party reverse geocoding service, the location determination 110 may not access the third-party geocoding service, and instead, access another resource (e.g., the map database of the system 100) or other internal databases. In addition, different resources may be available for different geographic regions in which the location data point is located in.

For example, FIG. 2B illustrates another example for determining location information, according to an embodiment. FIG. 2B is similar to FIG. 2A except that in FIG. 2B, the location determination 110 does not individually access or attempt to access a location-specific third-party reverse geocoding service. The location determination 110 receives a location data point from a client device (255) and determines if the location data point is within a predefined region (260). If yes, the identified location information corresponding to the predefined region is transmitted to the client device (265).

If the location data point is not within a predefined region, the location determination 110 determines if a third-party reverse geocoding service is available or accessible (270). If a third-party reverse geocoding service is available or accessible, the location determination 110 transmits a request to the service (275). The third-party reverse geocoding service can perform a translation of the location data point to an address, such as a street address, and return a result to the location determination 110. The location determination 110 can transmit the address to the client device (278).

If no third-party reverse geocoding service is available or accessible, the location determination 110 determines if the map database of the system 100 is available (280). If yes, the location information or address corresponding to the location data point is retrieved from the map database and transmitted to the client device (285). If the map database of the system 100 is unavailable, the location determination 110 can identify a custom text string to transmit to the client device (290).

Figure 3:
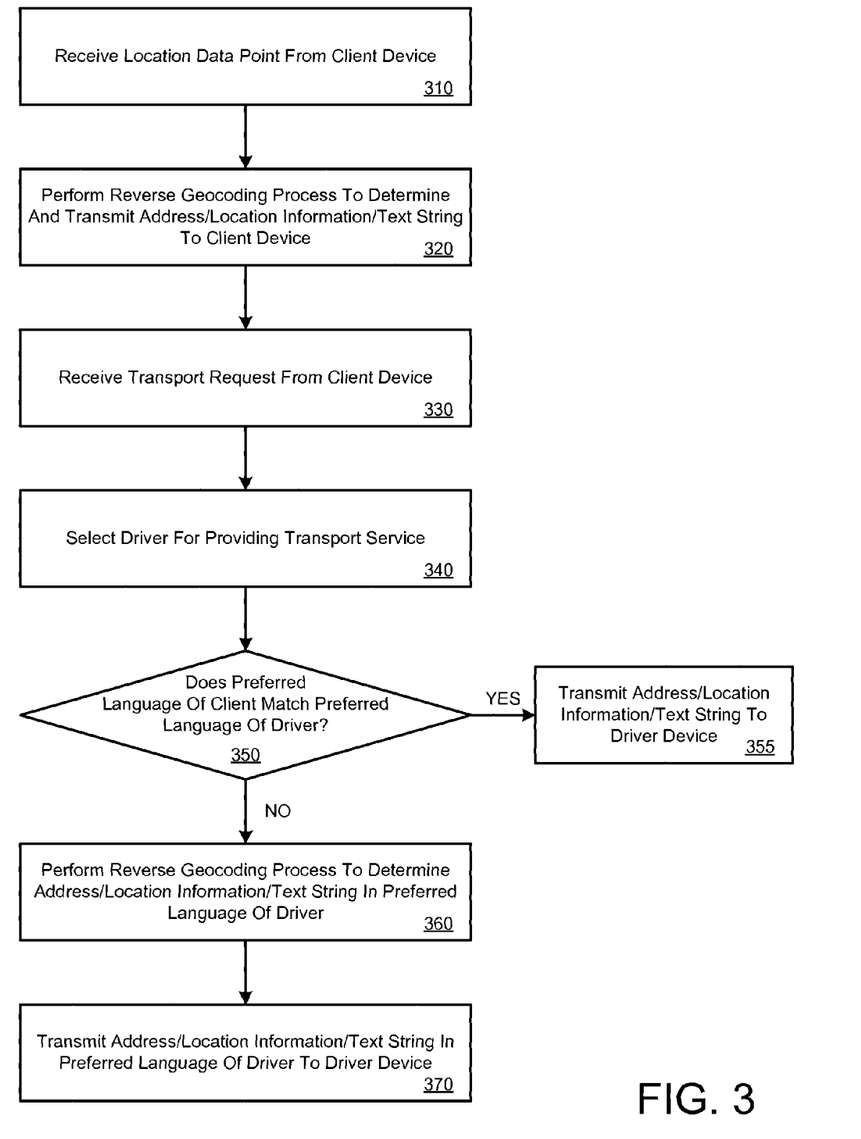
FIG. 3 illustrates an example method for determining location information, according to another embodiment.

FIG. 3 illustrates an example method for determining location information, according to another embodiment. A method such as described by an example of FIG. 3 can be implemented using, for example, components described with an embodiment of FIG. 1. Accordingly, references made to elements of FIG. 1 are for purposes of illustrating a suitable element or component for performing a step or sub-step being described.

The system 100 can receive a location data point from a client device (310). The client device can run a service application, for example, in which a user of the client device can specify a location for use with an on-demand or location-based service. In one example, the service application can provide a map interface in which a user can select the location by moving a graphic feature on the map interface. The selected location can correspond to a location data point, such as a latitude and a longitude.

In response to receiving the location data point, the location determination 110 performs a reverse geocoding process to determine the address or location information corresponding to the received location data point (320). In some examples, the reverse geocoding process can correspond to steps 210-250 of FIG. 2A or steps 260-290 of FIG. 2B. The location determination 110 provides the result of the reverse geocoding process, e.g., an address, location information, or custom text string, to the client device. The user can also continue to change the location on the map interface before he or she make a transport request or in some embodiments, can change the location even after the transport request is made (but before a predetermined time before the estimated time of arrival by a driver). The location determination 110 can continue to perform the reverse geocoding process (320) each time the client device provides a different location data point to the system 100 (e.g., each time the user moves the graphic feature on the map interface of the service application).

In some examples, the user can make an on-demand service request to the system 100 (e.g., a delivery request, an entertainment service request, a transport request, etc.) via the client device using the location data point (330). The system 100 can arrange for the on-demand service to be provided for the user by a service provider. For example, the system 100 can use information about the transport service request, information about the user, and information about available drivers in a geographic region corresponding to the location data point to select a driver to provide the transport service (340). In other on-demand service examples, the system 100 can select a particular driver for performing a delivery service, select a food vendor for providing a food service, etc. Information about the transport service can be provided to both the client device of the user and the driver device of the driver.

For example, for a transport service, a driver should know the pick-up location specified by the user. The user specifies the pick-up location and can receive the street address or location information identified by the system 100 via the reverse geocoding process described in FIG. 2A or 2B. Such information should also be provided to the driver. In one embodiment, the location determination 110 can provide the address or location information to the user in a preferred language of the user. The location determination 110 can determine if the preferred language of the user matches the preferred language of the driver (350). If the preferred languages match, the location determination 110 can transmit the already determined address or location information to the device of the driver (355).

On the other hand, if the preferred language of the user does not match the preferred language of the driver, the location determination 110 can (i) perform a translation of the determined address or location information, (ii) access a third-party translation service to perform the translation of the determined address or location information, and/or (iii) perform the reverse geocoding process a second time, which can include making the reverse geocoding request to a third-party reverse geocoding service for an address or location information in the preferred language of the driver (360). The address or location information that is in the preferred language of the driver can be provided to the device of the driver (370).

Hardware Diagrams

Figure 4:
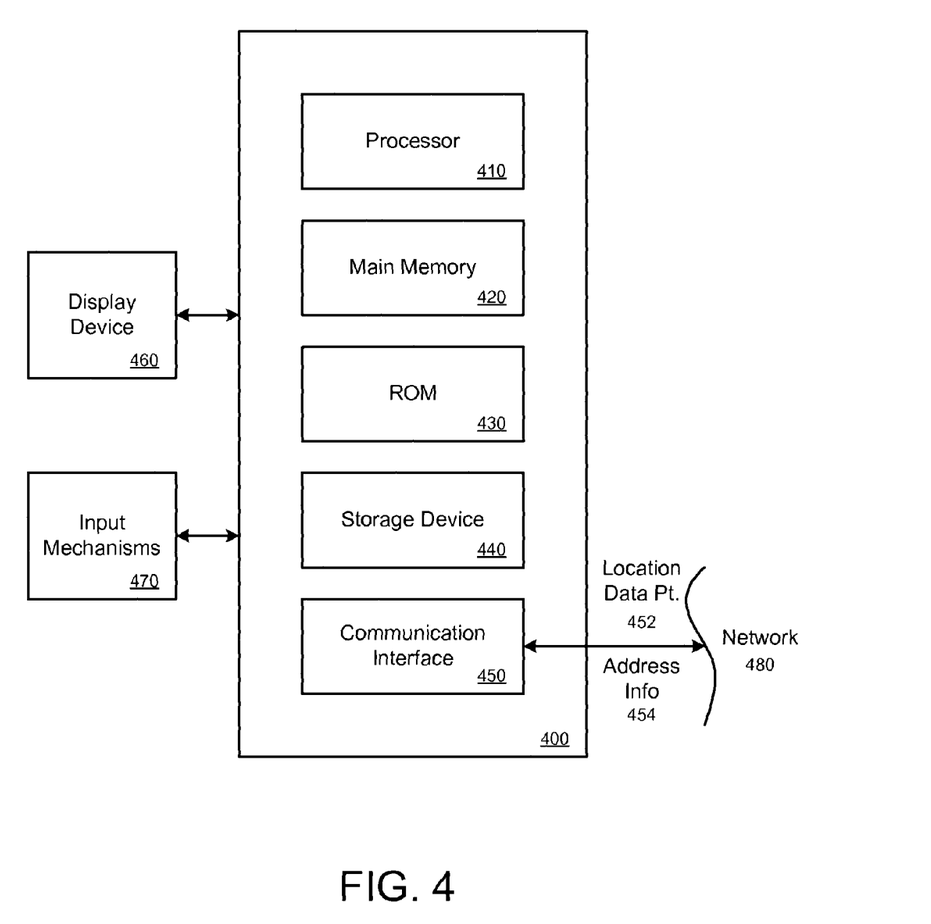
FIG. 4 is a block diagram that illustrates a computer system upon which embodiments described herein may be implemented.

FIG. 4 is a block diagram that illustrates a computer system upon which embodiments described herein may be implemented. For example, in the context of FIG. 1, the system 100 may be implemented using a computer system such as described by FIG. 4. The system 100 may also be implemented using a combination of multiple computer systems as described by FIG. 4.

In one implementation, the computer system 400 includes processing resources 410, a main memory 420, a read only memory (ROM) 430, a storage device 440, and a communication interface 450. The computer system 400 includes at least one processor 410 for processing information and the main memory 420, such as a random access memory (RAM) or other dynamic storage device, for storing information and instructions to be executed by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or optical disk, is provided for storing information and instructions, including instructions for implementing components of the system 100 of FIG. 1. According to some examples, the processor 410 can execute the instructions stored in the ROM 430 and/or the storage device 440 to implement logic for performing a reverse geocoding process, such as described in FIGS. 1 through 3.

The communication interface 450 can enable the computer system 400 to communicate with one or more networks 480 (e.g., cellular network) through use of the network link (wireless or wireline). Using the network link, the computer system 400 can communicate with one or more computing devices, and one or more servers. In some variations, the computer system 400 can be receive location data points 452 from one or more client devices via the network link. A location data point 452 can be processed by the processor 410 to determine an address or location information corresponding to the location data point 452. The determined address information 454 can be transmitted to the client device (e.g., that provided the location data point 452) over the network 480 and/or to a driver device of a driver that has been selected to provide a transport service for the user of the client device.

The computer system 400 can also include a display device 460, such as a cathode ray tube (CRT), an LCD monitor, or a television set, for example, for displaying graphics and information to a user. An input mechanism 470, such as a keyboard that includes alphanumeric keys and other keys, can be coupled to the computer system 400 for communicating information and command selections to the processor 410. Other non-limiting, illustrative examples of input mechanisms 470 include a mouse, a trackball, touch-sensitive screen, or cursor direction keys for communicating direction information and command selections to the processor 410 and for controlling cursor movement on the display 460.

Examples described herein are related to the use of the computer system 400 for implementing the techniques described herein. According to one embodiment, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
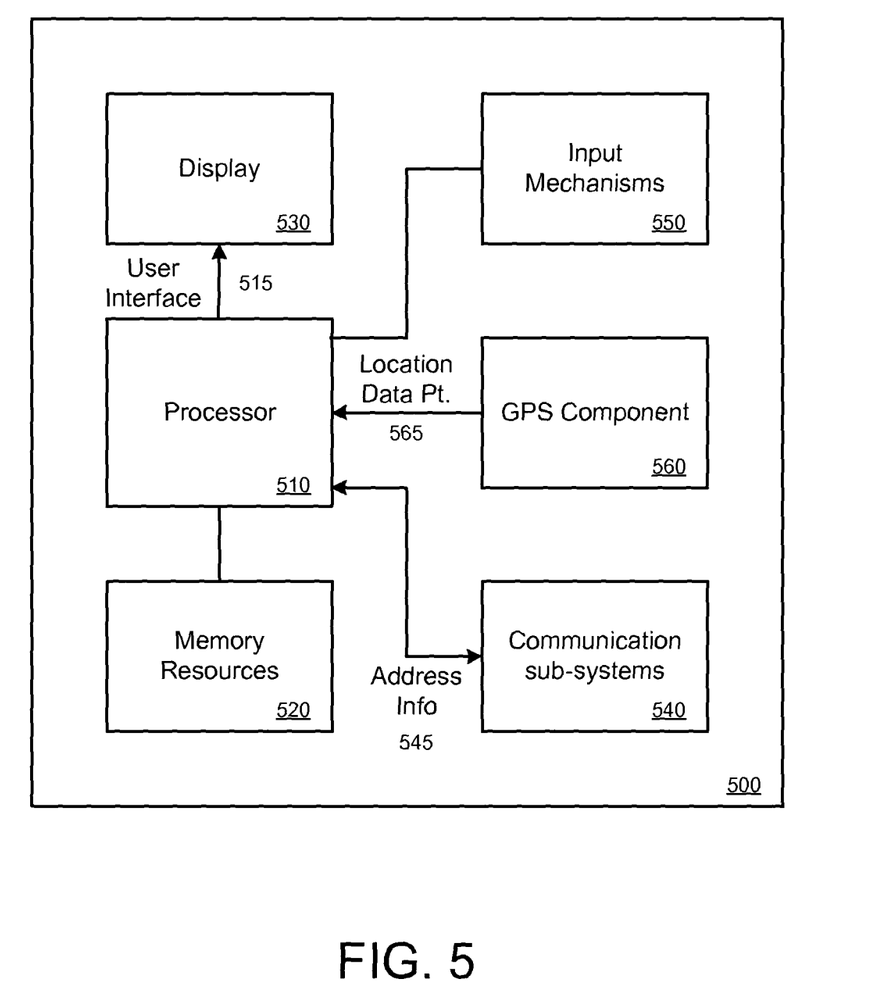
FIG. 5 is a block diagram that illustrates a mobile computing device upon which embodiments described herein may be implemented.

FIG. 5 is a block diagram that illustrates a mobile computing device upon which embodiments described herein may be implemented. In one embodiment, a computing device 500 may correspond to a mobile computing device, such as a cellular device that is capable of telephony, messaging, and data services. The computing device 500 can correspond to a client device or a driver device. Examples of such devices include smartphones, handsets or tablet devices for cellular carriers. The computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more location detection mechanisms (e.g., GPS component) 560. In one example, at least one of the communication sub-systems 540 sends and receives cellular data over data channels and voice channels.

The processor 510 is configured with software and/or other logic to perform one or more processes, steps and other functions described with implementations, such as described by FIGS. 1 through 4, and elsewhere in the application. The processor 510 is configured, with instructions and data stored in the memory resources 520, to operate a service application as described in FIGS. 1 through 4. For example, instructions for operating the service application in order to display user interfaces can be stored in the memory resources 520 of the computing device 500.

A user can operate the service application on the computing device 500 so that a location data point 565 can be determined for a selected location (e.g., using the GPS component 560). The location data point 565 can be wirelessly transmitted to the system via the communication sub-systems 540. The system can perform a reverse geocoding process to determine an address or location information corresponding to the location data point 565 and transmit the determined address or location information to the computing device 500. The address information 545 can be processed by the processor 510 to provide the address on the display 530 as part of the user interface 515.

For example, the processor 510 can provide a variety of content to the display 730 by executing instructions and/or applications that are stored in the memory resources 520. One or more user interfaces 515 can be provided by the processor 510, such as a user interface for the service application, which can include the received address information 545. While FIG. 5 is illustrated for a mobile computing device, one or more embodiments may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer-implemented method for determining location information, the method comprising:
   receiving, at a server, a location data point from a client device;
   selecting, by the server, a location lookup resource from a plurality of location lookup resources to translate the location data point to location information associated with the location data point;
   determining, by the server, location information associated with the location data point using the selected location lookup resource, the location information comprising an instruction to move to a particular location that is different from the location data point due to an event associated with the location data point; and
   providing, by the server, the location information to the client device.

2. The computer-implemented method of claim 1, wherein the event comprises traffic at a geographic location associated with the location data point.

3. The computer-implemented method of claim 1, wherein selecting the location lookup resource from the plurality of location lookup resources comprises:
   accessing a geofence database stored at the server that stores a plurality of geofences, each geofence associated with a predefined geographical region and location information associated with the predefined geographical region;
   determining whether the location data point is within a predefined region associated with one of the plurality of geofences;
   responsive to the location data point being within a predefined region of a geofence from the plurality of geofences, determining location information associated the geofence that corresponds to the predefined region.

4. The computer-implemented method of claim 3, further comprising:
   responsive to the location data point not being within one of the predefined regions associated with the plurality of geofences, determining whether a third-party reverse geocoding service from a plurality of third-party reverse geocoding services is available for translating the location data point to location information;
   responsive to a third-party reverse geocoding service being available, receiving from the third-party reverse geocoding service the location information associated with the location data point.

5. The computer-implemented method of claim 4, wherein determining whether the third-party reverse geocoding service is available comprises:
   transmitting a request to one or more of the plurality of third-party reverse geocoding services to translate the location data point into location information.

6. The computer-implemented method of claim 4, further comprising:
   responsive to none of the third-party reverse geocoding services being available to translate the location data point into location information, accessing a map database stored by the server that stores mapping information;
   determining whether the location data point is associated with mapping information stored in the map database; and
   responsive to the location data point being associated with mapping information in the map database, determining the location information for the location data point based on the associated mapping information.

7. The computer-implemented method of claim 6, further comprising:
   responsive to the map database lacking mapping information associated with the location data point, determining a notification that indicates location information is unavailable for the location data point and transmitting the notification to the client device.

8. The computer-implemented method of claim 1, wherein receiving the location data point comprises:
   receiving a request for a transport service from the client device, the request including the location data point; and
   selecting, by the server, a driver to provide the transport service based on the location data point.

9. The computer-implemented method of claim 8, wherein selecting the driver comprises:
   determining a preferred language of a user associated with the client device; and
   determining a driver from a plurality of drivers that has a preferred language that matches the preferred language of the user.

10. The computer-implemented method of claim 1, wherein each of the plurality of location lookup resources is configured to translate the location data point to location information using a translation methodology associated with the location lookup resource.

11. A non-transitory computer-readable storage medium storing executable instructions that when executed by one or more computer processors of a server cause the server to perform steps comprising:
   receiving, at the server, a location data point from a client device;
   selecting, by the server, a location lookup resource from a plurality of location lookup resources to translate the location data point to location information associated with the location data point;

determining, by the server, location information associated with the location data point using the selected location lookup resource, the location information comprising an instruction to move to a particular location that is different from the location data point due to an event associated with the location data point; and providing, by the server, the location information to the client device.

12. The non-transitory computer-readable storage medium of claim 11, wherein the event comprises traffic at a geographic location associated with the location data point.

13. The non-transitory computer-readable storage medium of claim 11, wherein selecting the location lookup resource from the plurality of location lookup resources comprises:

accessing a geofence database stored at the server that stores a plurality of geofences, each geofence associated with a predefined geographical region and location information associated with the predefined geographical region;

determining whether the location data point is within a predefined region associated with one of the plurality of geofences;

responsive to the location data point being within a predefined region of a geofence from the plurality of geofences, determining location information associated the geofence that corresponds to the predefined region.

14. The non-transitory computer-readable storage medium of claim 13, wherein the instructions when executed by one or more computer processors of the server further cause the server to perform further steps comprising:

responsive to the location data point not being within one of the predefined regions associated with the plurality of geofences, determining whether a third-party reverse geocoding service from a plurality of third-party reverse geocoding services is available for translating the location data point to location information;

responsive to a third-party reverse geocoding service being available, receiving from the third-party reverse geocoding service the location information associated with the location data point.

15. The non-transitory computer-readable storage medium of claim 14, wherein the instructions when executed by one or more computer processors of the server further cause the server to perform further steps comprising:

responsive to none of the third-party reverse geocoding services being available to translate the location data point into location information, accessing a map database stored by the server that stores mapping information;

determining whether the location data point is associated with mapping information stored in the map database; and responsive to the location data point being associated with mapping information in the map database, determining the location information for the location data point based on the associated mapping information.

16. A computer system comprising:

one or more computer processors; and a non-transitory computer-readable storage medium storing executable instructions when executed by the one or more computer processors causes the computer system to perform steps comprising:

receiving, at the computer system, a location data point from a client device;

selecting, by the computer system, a location lookup resource from a plurality of location lookup resources to translate the location data point to location information associated with the location data point;

determining, by the computer system, location information associated with the location data point using the selected location lookup resource, the location information comprising an instruction to move to a particular location that is different from the location data point due to an event associated with the location data point; and providing, by the computer system, the location information to the client device.

17. The computer system of claim 16, wherein the event comprises traffic at a geographic location associated with the location data point.

18. The computer system of claim 16, wherein selecting the location lookup resource from the plurality of location lookup resources comprises:

accessing a geofence database stored at the server that stores a plurality of geofences, each geofence associated with a predefined geographical region and location information associated with the predefined geographical region;

determining whether the location data point is within a predefined region associated with one of the plurality of geofences;

responsive to the location data point being within a predefined region of a geofence from the plurality of geofences, determining location information associated the geofence that corresponds to the predefined region.

19. The computer system of claim 18, wherein the instructions when executed by one or more computer processors of the computer system further cause the computer system to perform further steps comprising:

responsive to the location data point not being within one of the predefined regions associated with the plurality of geofences, determining whether a third-party reverse geocoding service from a plurality of third-party reverse geocoding services is available for translating the location data point to location information;

responsive to a third-party reverse geocoding service being available, receiving from the third-party reverse geocoding service the location information associated with the location data point.

20. The computer system of claim 19, wherein the instructions when executed by one or more computer processors of the computer system further cause the computer system to perform further steps comprising:

responsive to none of the third-party reverse geocoding services being available to translate the location data point into location information, accessing a map database stored by the server that stores mapping information;

determining whether the location data point is associated with mapping information stored in the map database; and responsive to the location data point being associated with mapping information in the map database, determining the location information for the location data point based on the associated mapping information.

* * * * *

UNITED STATES PATENT AND TRADEMARK OFFICE
CERTIFICATE OF CORRECTION

PATENT NO. : 9,933,274 B2  
APPLICATION NO. : 15/682281  
DATED : April 3, 2018  
INVENTOR(S) : Paul-Phillip Holden et al.

Page 1 of 1

It is certified that error appears in the above-identified patent and that said Letters Patent is hereby corrected as shown below:

In Claim 3, Column 17, Line(s) 64-65: "information associated the geofence" to read as
– information associated with the geofence –

In Claim 13, Column 19, Line(s) 28-29: "information associated the geofence" to read as
– information associated with the geofence –

In Claim 18, Column 20, Line(s) 32-33: "information associated the geofence" to read as
– information associated with the geofence –

Signed and Sealed this
Fourth Day of September, 2018

Andrei Iancu
*Director of the United States Patent and Trademark Office*